(12) United States Patent
Pau et al.

(10) Patent No.: US 6,934,329 B1
(45) Date of Patent: Aug. 23, 2005

(54) METHOD OF VARYING THE BIT RATE OF THE DATA STREAM OF CODED VIDEO PICTURES

(75) Inventors: Danilo Pau, Sesto San Giovanni (IT); Luca Bortot, Milan (IT); Maria Luisa Sacchi, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 474 days.

(21) Appl. No.: 09/712,509

(22) Filed: Nov. 14, 2000

(30) Foreign Application Priority Data

Nov. 16, 1999 (EP) .................................. 99830713

(51) Int. Cl.[7] .............................................. H04N 7/18
(52) U.S. Cl. ........................ 375/240.02; 375/240.04; 375/240.05
(58) Field of Search ..................... 375/240.02–240.08

(56) References Cited

U.S. PATENT DOCUMENTS

| | | | | |
|---|---|---|---|---|
| 5,608,654 | A | | 3/1997 | Matsunoshita .............. 364/514 |
| 5,754,235 | A | | 5/1998 | Urano et al. ................. 348/405 |
| 6,081,295 | A | * | 6/2000 | Adolph et al. ........... 375/240.03 |
| 6,426,974 | B2 | * | 7/2002 | Takahashi et al. ...... 375/240.03 |
| 6,587,508 | B1 | * | 7/2003 | Hanamura et al. ..... 375/240.24 |
| 6,590,936 | B1 | * | 7/2003 | Kadono ................... 375/240.12 |

FOREIGN PATENT DOCUMENTS

| | | |
|---|---|---|
| EP | 0845908 | 6/1998 |
| EP | 0899961 | 3/1999 |
| WO | 97/47128 | 12/1997 |

* cited by examiner

*Primary Examiner*—Andy Rao
(74) *Attorney, Agent, or Firm*—Lisa K. Jorgenson; Allen, Dyer, Doppelt, Milbrath & Gilchrist, P.A.

(57) ABSTRACT

A method of producing an output bitstream of coded digital video data with a bit-rate different from the bit-rate of an input bitstream includes dividing the input bitstream into a sequence of coded data and a sequence of control bits. The sequence of control bits is modified as a function of the desired bit-rate of the output bitstream that is different from the bit-rate of the input bitstream. An output sequence of control bits is produced. The method further includes decoding the sequence of coded data producing an intermediate sequence of data, and quantizing with a pre-established step and coding the intermediate sequence of data producing an output sequence of coded data. The output sequences producing the output bitstream are merged with the desired bit-rate.

27 Claims, 7 Drawing Sheets

METHOD OF VARYING THE BIT RATE OF THE DATA STREAM OF CODED VIDEO PICTURES

FIELD OF THE INVENTION

The present invention relates in general to the processing of digitized pictures, and, in particular, to a technique for varying the bit-rate of a data stream of digitized video pictures.

The present invention is also applicable to processing systems of coded video pictures. Due to the particular importance of the MPEG standard in treating digitized video sequences, reference will be made to an MPEG2 system for illustrating application of the present invention. In addition to an MPEG2 system, the method of the invention may also be used in processing systems that transfer video sequences based on other type standards.

BACKGROUND OF THE INVENTION

Video coding according to the MPEG2 standard will be discussed below. The MPEG (Moving Pictures Experts Group) standard defines a set of algorithms dedicated to the compression of sequences of digitized pictures. These techniques are based on the reduction of the spatial and temporal redundance of the sequence. Reduction of spatial redundance is achieved by compressing independently the single images using quantization, discrete cosine transforms (DCT) and Huffman coding.

The reduction of temporal redundance is obtained using the correlation that exist between successive pictures of a sequence. Approximately each image can be expressed locally as a translation of a preceding and/or successive image of the sequence. To this end, the MPEG standard uses three kinds of pictures, indicated with an I (Intra Coded Frame), P (Predicted Frame) and B (Bidirectionally Predicted Frame). The I pictures are coded in a fully independent mode. The P pictures are coded with respect to a preceding I or P picture in the sequence. The B pictures are coded with respect to two pictures, an I or P kind, with the preceding one and the following one in the video sequence (FIG. 1).

A typical sequence of pictures may be as follows: I B B P B B P B B I B . . . This is the order in which they will be viewed. However, given that any P is coded with respect to the preceding I or P, and any B is coded with respect to the preceding and following I or P, it is necessary that the decoder receive the P pictures before the B pictures, and the I pictures before the P pictures. Therefore, the order of transmission of the pictures will be I P B B P B B I B B . . .

Pictures are processed by the coder sequentially in the indicated order, and are successively sent to a decoder which decodes and reorders them, thus allowing their successive displaying. To code a B picture it is necessary for the coder to keep in a dedicated memory buffer, called a frame memory, the I and P pictures coded and thereafter decoded, to which current B picture refers. This requires an appropriate memory capacity.

One of the most important concepts in coding is motion estimation. Motion estimation is based on the following consideration. A set of pixels of a frame of a picture may be placed in a position of a successive picture obtained by translating the preceding one. These transpositions of objects may expose parts that were not visible before as well as changes of their shape, e.g., during a zooming.

The family of algorithms suitable to identify and associate these portions of pictures is generally referred to as motion estimation. Such an association of pixels is instrumental to calculate a difference picture, thus removing redundant temporal information and making more effective the successive processes of DCT compression, quantization and entropic coding.

A typical example of a method using the standard MPEG2 will now be discussed. A block diagram of a video MPEG2 coder is depicted in FIG. 2. Such a system is formed by the following functional blocks.

Chroma filter block from 4:2:2 to 4:2:0. In this block there is a low pass filter operating on the chrominance component which allows the substitution of any pixel with the weighed sum of neighboring pixels placed on the same column and multiplied by appropriate coefficients. This allows a successive subsampling by two, thus obtaining a halved vertical definition of the chrominance.

Frame ordinator. This blocks is composed of one or several frame memories outputting the frames in the coding order required by the MPEG standard. For example, if the input sequence is I B B P B B P etc., the output order will be I P B B P B B . . . The Intra coded picture I is a frame or a semi-frame containing temporal redundance. The Predicted-picture P is a frame or semi-frame from which the temporal redundance with respect to the preceding I or P (precedingly coded/decoded) has been removed. The Biredictionally predicted-picture B is a frame or a semi-frame whose temporal redundance with respect to the preceding I and successive P (or preceding P and successive I) has been removed. In both cases the I and P pictures must be considered as already coded/decoded.

Estimator. This is the block that removes the temporal redundance from the P and B pictures.

DCT. This is the block that implements the discrete cosine transform according to the MPEG2 standard. The I picture and the error pictures P and B are divided in blocks of 8*8 pixels Y, U, and V on which the DCT transform is performed.

Quantizer Q. An 8*8 block resulting from the DCT transform is then divided by a quantizing matrix to reduce the magnitude of the DCT coefficients. In such a case, the information associated to the highest frequencies which are less visible to human sight tend to be removed. The result is reordered and sent to the successive block.

Variable Length Coding (VLC). The codification words output from the quantizer tend to contain a large number of null coefficients followed by non-null values. The null values preceding the first non-null value are counted and the count figure forms the first portion of a codification word, and the second portion of which represents the non-null coefficient.

These pairs tend to assume values more probable than others. The most probable ones are coded with relatively short words composed of 2, 3 or 4 bits while the least probable are coded with longer words. Statistically, the number of output bits is less than in the case such a criterion is not implemented.

Multiplexer and buffer. Data generated by the variable length coder, i.e., the quantizing matrices, the motion vectors and other syntactic elements are assembled for constructing the final syntax considered by the MPEG2 standard. The resulting bitstream is stored in a memory buffer, the limit size of which is defined by the MPEG2 standard requirement that the buffer cannot be over filed. The quantizer block Q supports such a limit by making the division of the DCT 8*8 blocks dependent upon on how far the system is from the filling limit of such a memory buffer, and on the energy of the 8*8 source block taken upstream of the motion estimation and DCT transform steps.

Inverse Variable Length Coding (I-VLC). The variable length coding functions specified above are executed in an inverse order.

Inverse Quantization (IQ). The words output by the I-VLC block are reordered in the 8*8 block structure, which is multiplied by the same quantizing matrix that was used for its preceding coding.

Inverse DCT (I-DCT). The DCT transform function is inverted and applied to the 8*8 block output by the inverse quantization process. This permits passing from the domain of spatial frequencies to the pixel domain.

Motion Compensation and Storage. At the output of the I-DCT, one of the following two items may exist. A decoded I frame (or semiframe) that must be stored in a respective memory buffer for removing the temporal redundancy with respect thereto from successive P and B pictures. A decoded prediction error frame (or semiframe) P or B that must be summed to the information precedingly removed during the motion estimation phase. In case of a P picture, such a resulting sum which may be stored in dedicated memory buffer is used during the motion estimation process for the successive P pictures and B pictures. These frame memories are distinct from the frame memories that are used for re-arranging the blocks.

The MPEG2 decoding will be explained by referring to FIG. 3. The first I picture received is decoded by detecting the headers in the bitstream by the following: a HEADER-DETECTION block, a successive inverse VLC decoding, an inverse decoding of the run-level pairs, an inverse quantization, an inverse DCT computation and the successive storing in suitable memory buffers, and used to calculate the prediction error for decoding the successive P and B pictures.

In video broadcasting, the sequences are transmitted or are eventually recorded on a variety of channels and supports, each with its own capacity, speed and cost. Distribution of a film, starting from a master recording, may be made on a DVD (Digital Video Disk) or via satellite or cable. The available transmission band may be different from the one allocated during the coding phase of the video sequence. This raises the problem of re-adapting to the characteristics of new media a bitstream belonging to video pictures originally coded for a channel with a different bit-rate.

More specifically, this implies the need to modify the bit-rate B1 of a MPEG2 bitstream, expressed in B1 Mbit/s, and is generated after a coding of the source sequence in a bitstream still coherent to a MPEG2 syntax, with a B2 bit-rate, where B2 is different from B1. The bit-rate B1 is a bandwidth measure of the available channel. Such a change of bit-rate may be effected in a very straight forward manner without using dedicated devices.

Since an encoder and a decoder transform respectively a sequence of photograms into a MPEG2 bitstream, and a MPEG2 bitstream into decoded pictures starting from a bitstream coded with an arbitrary B1 bit-rate, it is always possible to obtain a bitstream with a B2 bit-rate by simply coupling the output of the decoder to the input of the encoder. This is done after having programmed the latter in order to code with the desired bit-rate B2.

This procedure, which may be defined as an explicit transcoding of a bitstream, requires the following steps:
1. inverse Huffman coding;
2. inverse run-length coding;
3. inverse quantization;
4. inverse Discrete Cosine Transform; and
5. motion compensation.

The above steps 1–5 are carried out in the decoder, while the encoder performs the following steps:
1. pre-processing;
2. motion estimation;
3. calculation of the prediction error;
4. Discrete Cosine Transform;
5. quantization;
6. run-length coding;
7. Huffman coding;
8. inverse quantization;
9. inverse discrete cosine transform; and
10. motion-compensation.

As it may be easily discerned, such a transcoding process entails a very complex computational complexity. The major computational burden of the above noted sequences dwells in the motion estimation step in the direct/inverse cosine transform steps and in the motion compensation step. In contrast, quantization, run-length coding and Huffman coding are relatively less demanding steps.

There is a need for a method of changing the bit-rate of a data stream of video pictures that is relatively easier to implement in hardware form and does not require burdensome calculations.

SUMMARY OF THE INVENTION

In view of the foregoing background, it is therefore an object of the present invention to change the bit-rate of a bitstream of video pictures using a reduced number of steps and simplify the required hardware resources for doing so.

This and other objects, features and advantages in accordance with the present invention are provided by a method for producing a bitstream relative to digital video pictures subdividible into a pair of bitstreams of coded data and control bits, respectively, having a bit-rate different from the bit-rate of an input bitstream.

This result is obtained by dividing the input bitstream into a sequence of data and into a sequence of control bits, and modifying the sequence of control bits obtained as a function of the different bit-rate to be output for producing an output sequence of control bits. The method further includes decoding the sequence of coded data producing an intermediate sequence of decoded data that is successively quantized with a pre-established step and coded for producing an output sequence of coded data. The output data stream of the desired bit-rate is produced by merging the two output sequences. Optionally, it is possible to dequantize the intermediate sequence of decoded data before carrying out the quantization with the pre-established step.

The method of the invention may be easily adapted to pictures coded according to the MPEG2 standard by making the decoding and coding operations operate in a Huffman decoding followed by a run-length decoding, and in a run-length coding followed by a Huffman coding, respectively. The quantization step is preferably determined by a feed-back/forward rate control technique or by a feed-back/forward rate control technique.

A hardware embodiment of this method may comprise a first circuit block separating the input stream into a sequence of coded data and into a sequence of control bits, and a second circuit block for modifying the sequence of control bits as a function of the different bit-rate that is desired for producing an output sequence of control bits. The hardware embodiment further includes a decoder for the sequence of coded data for producing an intermediate sequence of decoded data, and a quantizer for a pre-established step of the intermediate sequence of data. An encoder is coupled to the output of the quantizer for producing an output sequence of the coded data. A third circuit block merges the two output sequences and outputs a bitstream with the required bit-rate. Optionally, the device may include a dequantizer for the intermediate sequence of decoded data before the quantizer.

BRIEF DESCRIPTION OF THE DRAWINGS

The particular aspects and advantages of the invention will become even more evident through the following description of several embodiments of the invention and by referring to the attached drawings, wherein.

DETAILED DESCRIPTION OF THE PREFERRED EMBODIMENTS

The bit-rate is determined by the number of bits dedicated to the coding of the quantized DCT coefficients of the prediction error. By operating on the quantization parameter it is possible to increase or decrease the bit-rate. The selection of this parameter is made by the control module of the compression rate.

The portions of the bitstream that do not influence the reduction of the bit-rate are simply copied rather than processed. This occurs for the majority of the data relative to the syntax and, above all, for the motion vectors, because the motion field depends solely on the calculations carried out on the source sequence. Since the goal is to obtain a reduction of the bit-rate, the coding process is equivalently represented by the VLC inverse coding and by the run-length decoding. This is in reference to the MPEG2 standard.

It is not necessary to carry out a discrete inverse cosine transform and a motion compensation because the control of the bit-rate occurs in the frequency domain with a net saving of computational processing. Once the quantized DCT coefficients are extracted, they are requantized with a new quantization step. This step is typically different from the quantization step found in the input (source) bitstream, and the run-length and Huffman coding are finally performed.

Optionally, the requantization operation may be preceded by a de-quantization of the DCT coefficients in case it is desired to operate with non quantized values. Substantially, the computational savings derive from eliminating the motion compensation step, the motion estimation step, the direct and inverse discrete cosine transform steps.

Figure 1:
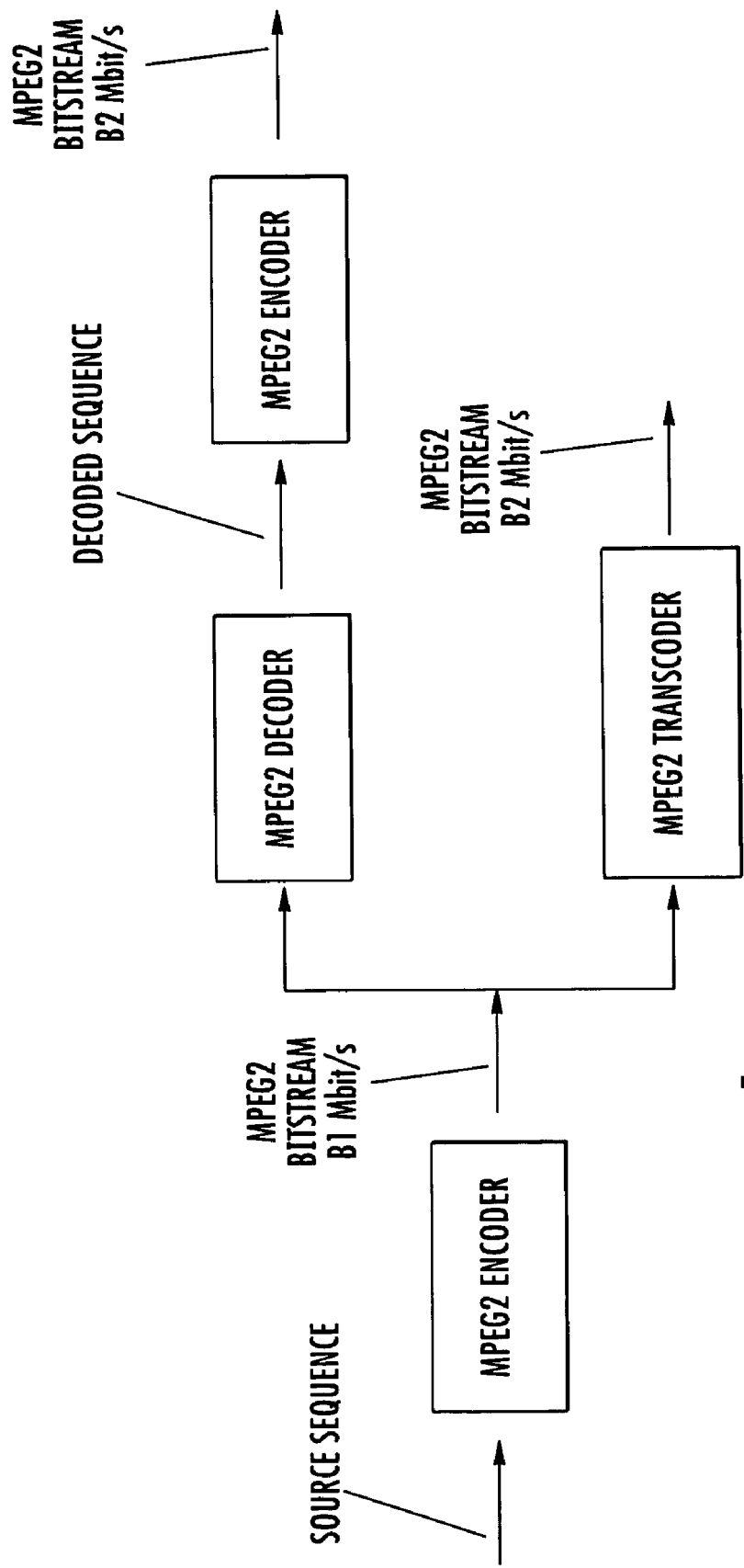
FIG. 1 is a block diagram comparing a known coding technique with the method according to the present invention.
Figure 2:
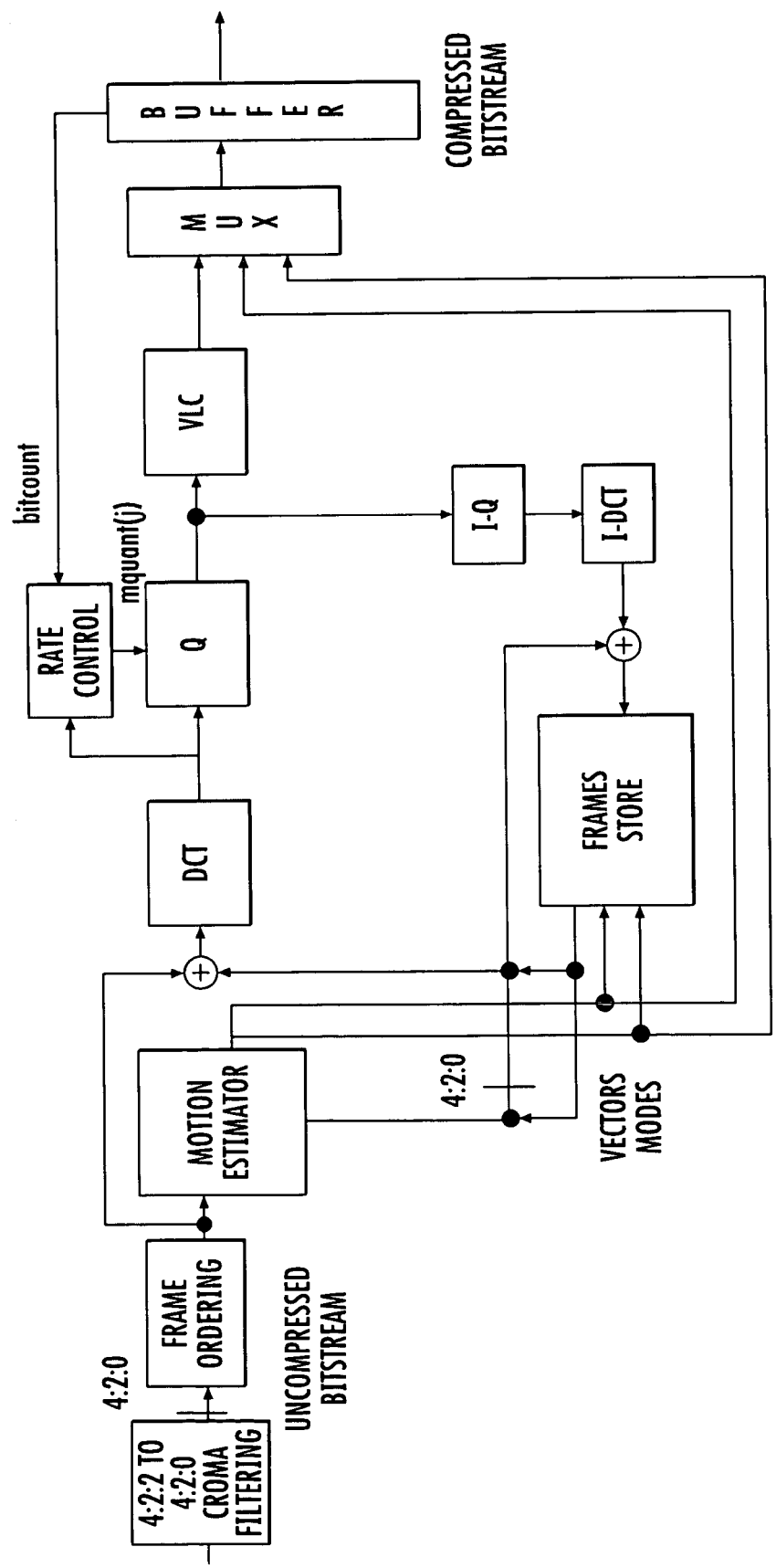
FIG. 2 is a block diagram of an MPEG2 encoder according to the prior art.
Figure 3:
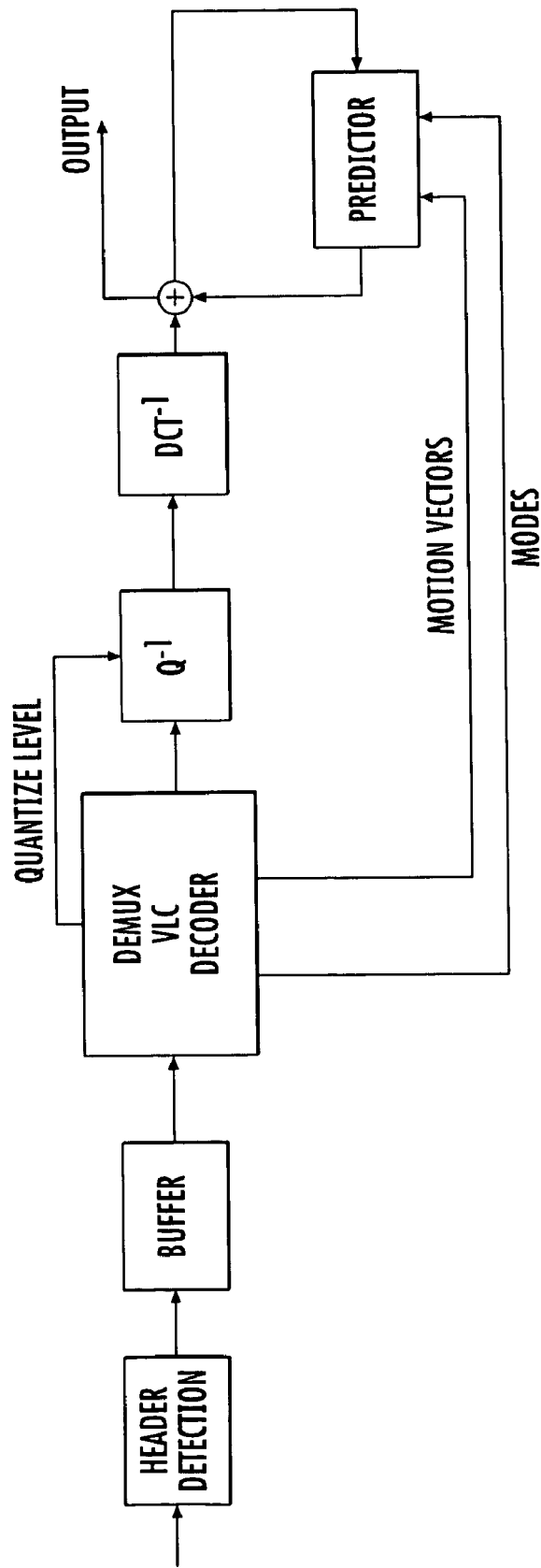
FIG. 3 is a block diagram of an MPEG2 decoder according to the prior art.

A comparison of the method of the invention and a normal coding technique is illustrated in FIG. 1. With the method of the invention it is possible to obtain directly an output data stream at the desired bit-rate of B2 Mbit/s through the block MPEG2_TRANSCODER that implements the method of the invention. This block processes an input data stream having a bit-rate of B1 Mbit/s as produced by an MPEG2_ENCODER that codes according to the MPEG2 standard the pixels of a SOURCE_SEQUENCE.

The same result may be obtained by connecting in cascade an MPEG2_DECODER and an MPEG2_ENCODER. However, as shown in FIG. 1, such an approach implies the generation of a sequence of decoded pictures DECODED_SEQUENCE with the associated costs in terms of processing complexity and time required.

Figure 4A:
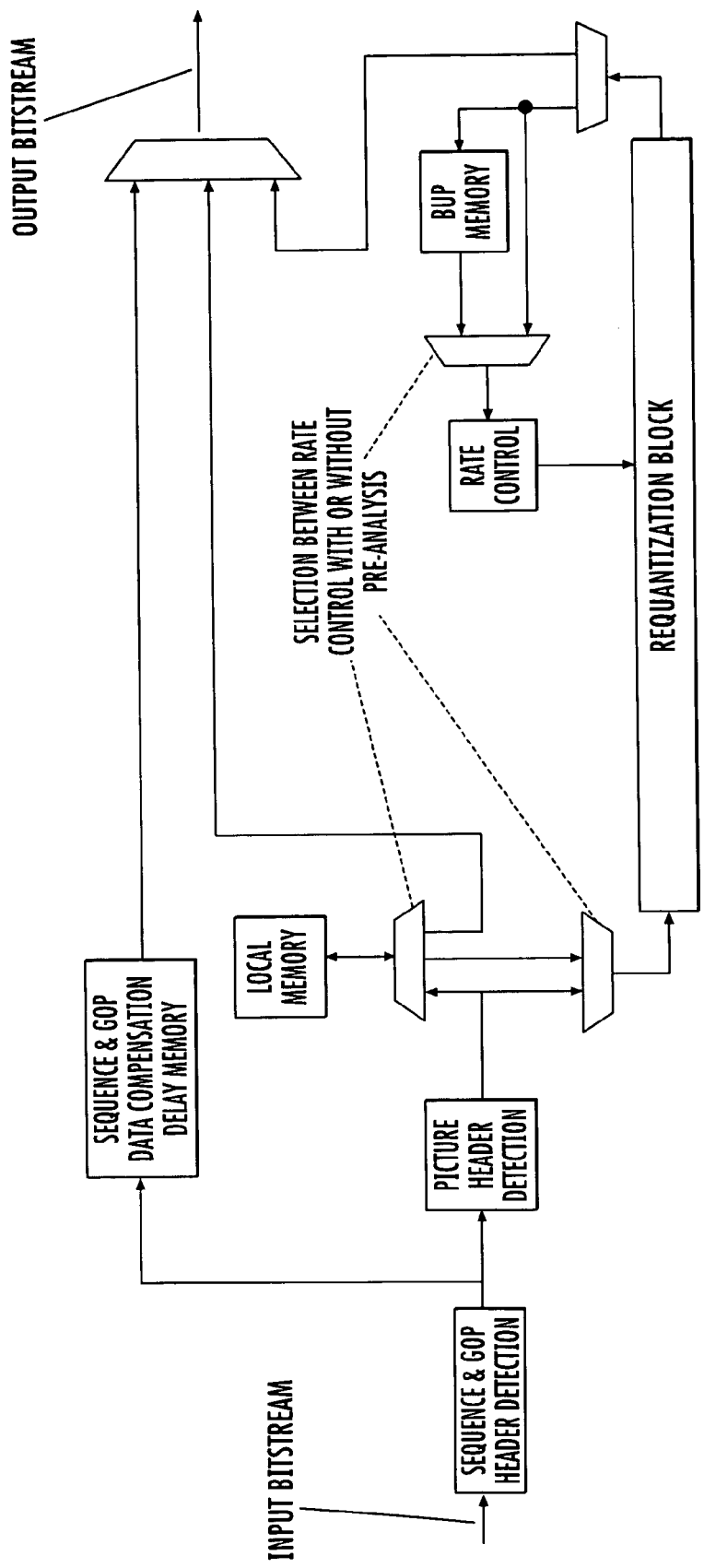
FIG. 4a is a block diagram of an architecture implementing the method according to the present invention.

A basic diagram of a hardware embodiment of the method of the invention is shown in FIG. 4a. The INPUT_BISTREAM is fed to a circuit block that separates the headers of the sequence and of the GOP (Group Of Pixels), which are successively adapted to the desired bit-rate and sent to a multiplexer that produces the output bitstream.

The PICTURE_HEADER_DETECTION block detects the presence of the control bits of a picture of the video sequence, separating them from the data bits that are sent to a REQUANTIZATION_BLOCK. This block carries out after the Huffman and run-length decoding process a dequantization and a quantization with a pre-established step, which is followed by a run-length coding and a Huffman coding. The step of quantization is determined by the RATE_CONTROL and BUP blocks that store the number of bits produced.

Figure 4B:
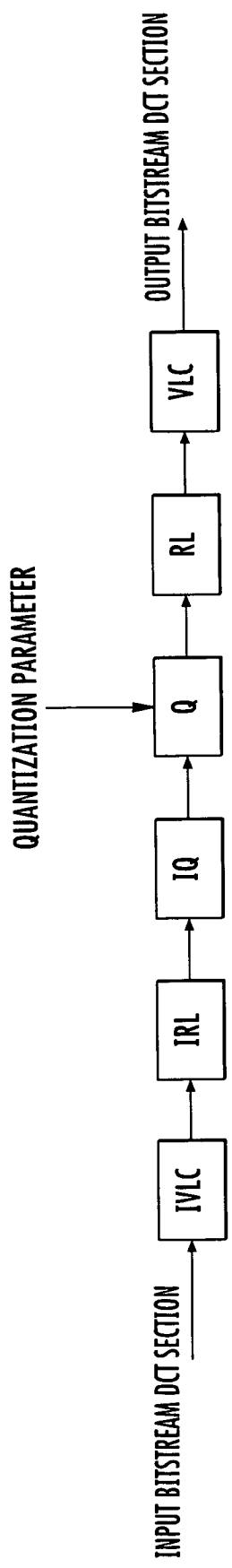
FIG. 4b illustrates a preferred embodiment of the quantization chain according to the present invention.

A preferred embodiment of the REQUANTIZATION_BLOCK is shown in FIG. 4b. The cascade of blocks perform the above mentioned Huffman decoding (IVLC), run-length decoding (IRL) and dequantization (IQ), followed by a quantization (Q) with a step determined by the QUANTIZATION_PARAMETER, and the run-length (RL) and Huffman (VLC) coding.

The compression rate may be regulated by dedicated multiplexers. There are essentially two multiplexer types: feed-back rate control and feed-back/forward (with pre-analysis) hybrid rate control.

The MPEG2, Test Model 5, provides a detailed description of the above mentioned techniques for regulating the compression rate. Other implementations of the above noted control techniques are described in the following European Patent Applications which are incorporated herein by reference in their entirety: 97830591.0, 98830599.1 and 99830560.1. These applications are assigned to the assignee of the present invention.

Figure 5:
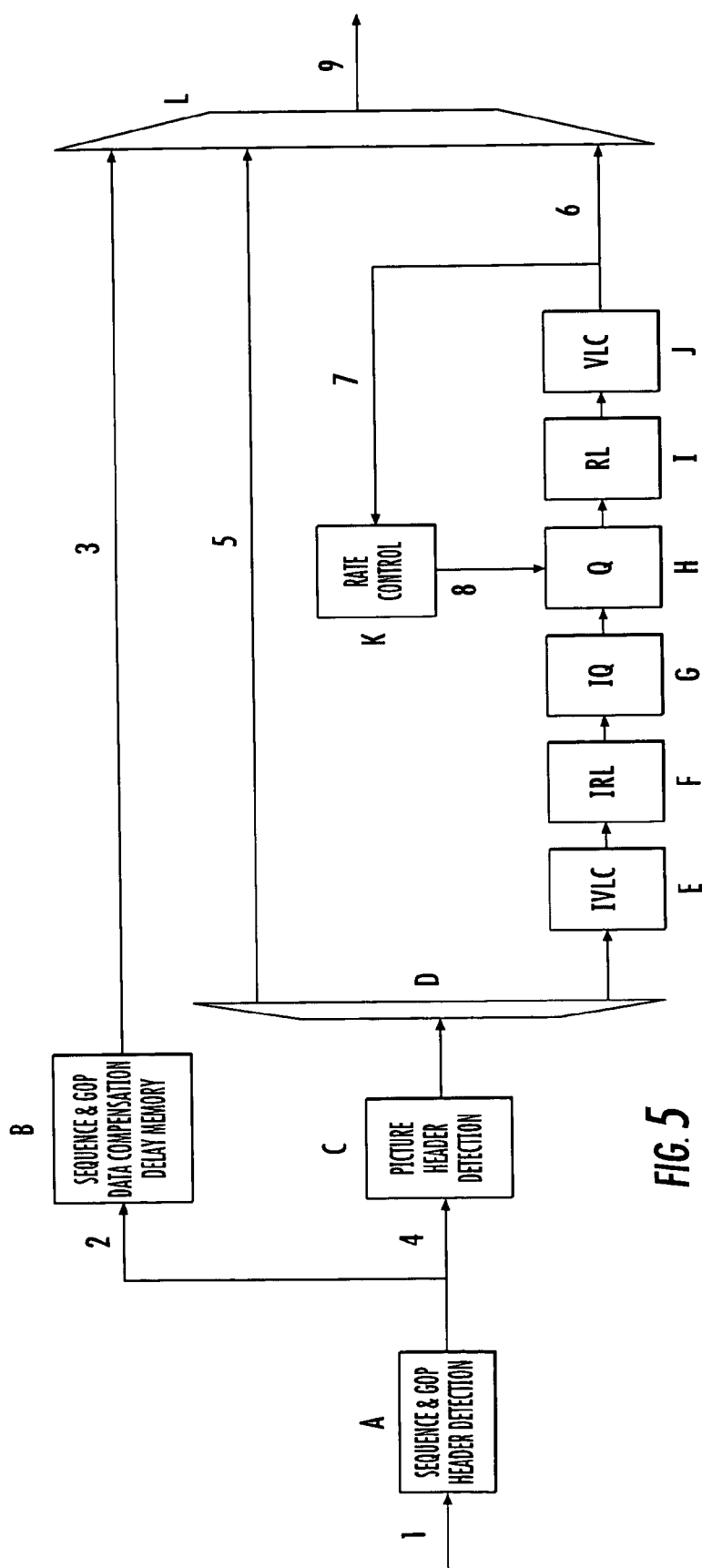
FIG. 5 is a block diagram of an architecture according to the present invention including a control of the feed-back compression rate.

A hardware embodiment of the feed-back technique of rate control is illustrated in FIG. 5. The following discussion is provided in reference to this figure. Through the input gate 1 the bitstream is transferred to circuit A. The first analysis takes place in this circuit. If data relative to the syntax of the sequence and of the GOP are detected, they are conveyed through circuit path 2 towards circuit B, which extracts certain format data, and circuit L synchronizes the output thereof.

When circuit A detects the start data of the picture, circuit C takes control until a new header of the sequence/GOP/ picture is detected. When circuit A starts to transmit picture data, circuit C conveys them through circuit D toward the requantization chain of circuits E–J. In this phase, circuit K provides the quantization parameter, and through circuit 7 collects information on the past performance of the coding process. Circuit L reconstructs the bitstream starting from the contribution of circuit 3 (syntax of the sequence and of the GOP), of circuit 5 (motion vectors) and of circuit 6 (DCT coefficients).

Figure 6:
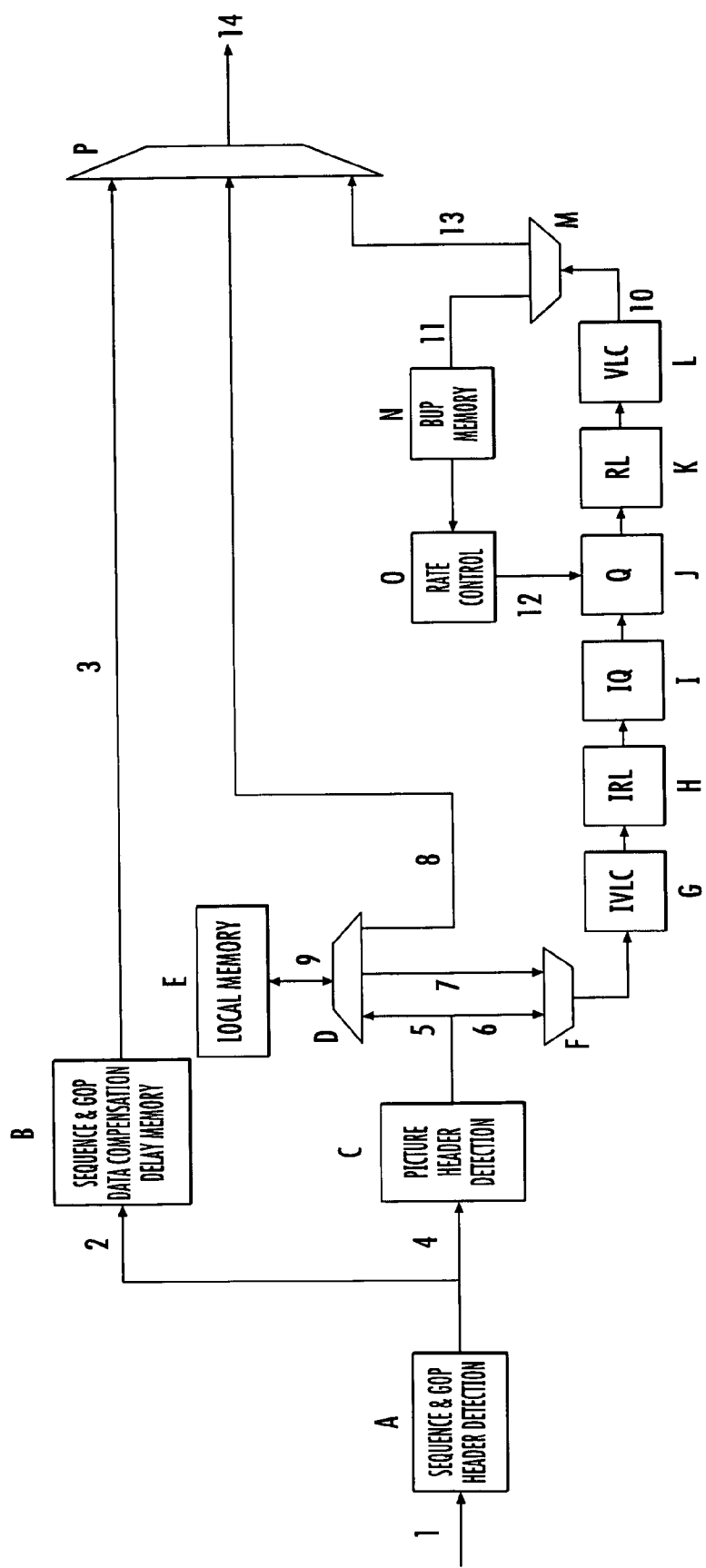
FIG. 6 is a block diagram of an architecture according to the present invention including a control of the feed-forward compression rate.

The alternative technique of rate control may be implemented by the architecture of FIG. 6. The following discussion is provided in reference to this figure. Through the input gate 1 the bitstream is conveyed to circuit A. Circuit A carries out a first analysis of the bitstream. If data relative to the syntax of the sequence and of the GOP are detected, they are conveyed through circuit path 2 toward circuit B which extracts certain format data, and circuit P synchronizes the output thereof. When circuit A detects the start data of a picture, circuit C takes control until a new header of the sequence/GOP/picture is detected.

Circuit C controls the timing between the pre-analysis and the recoding. When circuit A starts to transmit picture data, circuit C copies the data in buffer E and simultaneously conveys such data through circuit path 6 towards the requantization chain of circuits G–L. In this phase, circuit O provides the quantization parameter during the preanalysis phase, and circuit M sends the collected data to circuit N which constructs the Bit Usage Profile of the picture.

Thereafter, circuit C switches its output from circuit D towards circuit F so that the original data are read again by circuit E and retransmitted to the requantization chain. Circuit O supplies the quantization parameters of the final coding using the data collected by circuit N during the preanalysis. Circuit M outputs data towards circuit path 13 and sends the requantized and coded coefficients to circuit P. Circuit C inserts properly the data output by circuit M with the original motion vectors stored in circuit E during the pre-analysis phase. Circuit P reconstructs the bitstream starting from the contributions of circuit 3 (syntax of sequence and GOP), of circuit 8 (motion vectors) and of circuit 13 (DCT coefficients).

To further illustrate the functioning of the device of FIG. 6, reference may be made to the following representation in a C pseudo-code of the procedures performed by the main circuit blocks. It is useful to list several functions that are commonly used to access the bitstream: such as ShowBitsS(N) and ShowBitsC(N), which show, without moving from the actual position, the next N bits of the bitstream. The first function reads from input 1, and the second function reads from the picture memory (LOCAL_MEMORY).

Other functions include GetBitsS(N) and GetBitsC(N), which show the next N bits of the input bitstream and of the LOCAL_MEMORY, respectively. The cursor shifts by N positions. The function PutBitsD(bits) and PutBitsC(bits) write the past bits by argument in the output bitstream (14) and in the LOCAL_MEMORY, respectively.

The functions MoveBitsSD(N), MoveBitsSC(N) and MoveBitsCD(N) are combinations of GetBits*( ) and PutBits*( ) functions which allow the reading and moving of N bits from the input to the output, from the input to the LOCAL_MEMORY and from the LOCAL_MEMORY to the output, respectively.

The function of circuit blocks [A]+[B] include the VideoSequence( ) procedure that recognizes the header sections of the sequence and of GOP, and outputs them. When the start code of the picture is detected, control is passed to circuit C. In particular:

```
VideoSequence( )
{
while(NextStartCode( ) !=SEQUENCE_END_CODE)
{
if       (SEQUENCE_START_CODE       ||
   GOP_START_CODE)
{
/*copy input data to output*/
}
else if(PICTURE_START_CODE)
{
/*[C]*/
}
For circuit block C:
TranscodePictureData( )
{
PicturePreanalysis( )
PictureReshape( )
}
In the detail:
PicturePreanalysis( )
{
for(i=0; i<=MACROBLOCK COUNT; i++)
{
MoveBitsSC(MOTION_VECTORS)
mQuant=PreanalysisMQuant( )/*rate control [O]*/
Requantize(DCTMatrix, mQuant)
BUP[i]=BitCount(DCTMatrix)
}
```

The letter procedure carries out the analysis of the picture header, then it begins the macroblock loop until the end of the data section of the picture is reached. The bitstream access functions used in this case are the ReadBits( ), PutBitsC( ) and, above all, MoveBitsSC( ). This implies that, while the bitstream is consumed for performing the pre-analysis, the read bits are saved in the LOCAL_MEMORY.

The Requantizer( ) function is self-explanatory, whereas the BitCount( ) performs the run-length and Huffman coding without writing the result but counting only the bits produced. Such a number is written in the BUP.

At the end of this procedure the situation is as follows. The pointer to the source bitstream is positioned at the end of the data section of the picture. The pointer to the LOCAL_MEMORY is positioned at the start of the LOCAL_MEMORY itself, which contains a copy of the section of data of the picture just read from the source bitstream. In the output file none of the bits relative to the picture has been written yet.

```
Picture Reshape( )
{
for(i=0; i<=MACROBLOCK COUNT; i++)
{
MoveBitsCD(MOTION_VECTORS)
mQuant=ReshapeMQuant( )/*rate control*/
Requantize(DCTMatrix, mQuant)
PutBitsD(DCTMatrix)
}
}
```

This routine is very similar to a Picture Preanalysis( ), apart from the fact that, the functions to access the data become ReadBits( ), PutBitsD( ) and MoveBitsCD( ). At the end of this procedure the situation is as follows. The pointer to the source bitstream is set at the end of the data section of the picture. The pointer to the LOCAL_MEMORY is set at the end of the LOCAL_MEMORY itself, which will be successively emptied to receive the data belonging to the successive picture. The transcoded data of the picture have been written in the output file.

```
For circuit block O:
PreanalysisMQuant( )
{
/*returns previous picture's mean mQuant*/
}
```

The pre-analysis quantization parameter mQuant is the mean of the coding of the last common picture, i.e., of the same type I, P or B.

```
ReshapeMQuant( )
{
LocalError=BITS_PRODUCED−BUP
IntegralError+=LocalError
mQuant=PREANALYSIS_MQUANT+LocalError*PropCoeff
    +IntegralError*IntCoeff
}
```

At each coding step, the RATE_CONTROL circuit measures the offset from the ideal profile (LocalError) and calculates also the integral error. The mQuant value is then obtained by applying to the PI controller the coefficients PropCoeff and IntCoeff.

That which is claimed is:

1. A method of producing an output bitstream of coded digital video data having a desired bit-rate different from a bit-rate of an input bitstream of coded digital video data, the method comprising:
   dividing the input bitstream into a sequence of coded data and into a sequence of control bits;
   modifying the sequence of control bits as a function of the desired bit-rate of the output bitstream for producing an output sequence of control bits;
   decoding the sequence of coded data for producing an intermediate sequence of data;
   quantizing with a pre-established step and coding the intermediate sequence of data for producing an output sequence of coded data; and
   merging the output sequence of control bits and the output sequence of coded data for producing the output bitstream of coded digital video data having the desired bit-rate.

2. A method according to claim 1 wherein the intermediate sequence of data is dequantized before being quantized with the pre-established step.

3. A method according to claim 1 wherein the input and output bitstreams of coded digital video data comprise MPEG data.

4. A method according to claim 1 wherein the input and output bitstreams of coded digital video data comprise MPEG2 data.

5. A method according to claim 1 wherein the decoding comprises performing a Huffman decoding followed by a run-length decoding; and wherein coding comprises performing a run-length coding followed by a Huffman coding.

6. A method according to claim 1 wherein quantizing with the pre-established step comprises a feed-back rate control technique.

7. A method according to claim 1 wherein quantizing with the pre-established step comprises a feed-back/forward hybrid rate control technique.

8. A method of producing an output bitstream of coded digital video data having a desired bit-rate different from a bit-rate of an input bitstream of coded digital video data, the method comprising:
   dividing the input bitstream into a sequence of coded data and into a sequence of control bits;
   modifying the sequence of control bits as a function of the desired bit-rate of the output bitstream for producing an output sequence of control bits;
   decoding the sequence of coded data using a Huffman decoding followed by a run-length decoding for producing an intermediate sequence of data;
   quantizing with a pre-established step and coding the intermediate sequence of data using a run-length coding followed by a Huffman coding for producing an output sequence of coded data; and
   merging the output sequence of control bits and the output sequence of coded data for producing the output bitstream of coded digital video data having the desired bit-rate.

9. A method according to claim 8 wherein the intermediate sequence of data is dequantized before being quantized with the pre-established step.

10. A method according to claim 8 wherein the input and output bitstreams of coded digital video data comprise MPEG data.

11. A method according to claim 8 wherein the input and output bitstreams of coded digital video data comprise MPEG2 data.

12. A method according to claim 8 wherein quantizing with the pre-established step comprises a feed-back rate control technique.

13. A method according to claim 8 wherein quantizing with the pre-established step comprises a feed-back/forward hybrid rate control technique.

14. A device for producing a bitstream of coded digital video data having a bit-rate different from a bit-rate of an input bitstream of coded digital video data, the device comprising:
   a first circuit for separating the input bitstream into a sequence of coded data and into a sequence of control bits;
   a second circuit having an input for receiving the sequence of control bits, said second circuit for generating a modified sequence of control bits as a function of the desired bit-rate of the output bitstream for providing an output sequence of control bits;
   a decoder having an input for receiving the sequence of coded data and an output for providing an intermediate sequence of data;
   a quantizer for quantizing the intermediate sequence of data with a pre-established step;
   an encoder connected to an output of said quantizer for providing an output sequence of coded data; and
   a third circuit for merging the output sequence of control bits and the output sequence of coded data for producing the output bitstream having the desired bit-rate.

15. A device according to claim 14 further comprising a dequantizer connected between said decoder and said quantizer for dequantizing the intermediate sequence of data.

16. A device according to claim 14 wherein the input and output bitstreams of coded digital video data comprises MPEG data.

17. A device according to claim 14 wherein the input and output bitstreams of coded digital video data comprises MPEG2 data.

18. A device according to claim 14 wherein said decoder comprises a Huffman decoder and a run-length decoder connected in series thereto.

19. A device according to claim 14 wherein said encoder comprises a run-length coder and a Huffman coder connected in series thereto.

20. A device according to claim 14 further comprising a bit rate control circuit connected to said encoder for setting quantizing of the intermediate sequence of data by said quantizer.

21. A device according to claim 14 wherein said third circuit comprises a multiplexer connected to outputs of said first circuit, said second circuit and said encoder.

22. A device for producing a bitstream of coded digital video data having a bit-rate different from a bit-rate of an input bitstream of coded digital video data, the device comprising:
- a first circuit for separating the input bitstream into a sequence of coded data and into a sequence of control bits;
- a second circuit having an input for receiving the sequence of control bits, said second circuit for generating a modified sequence of control bits as a function of the desired bit-rate of the output bitstream for providing an output sequence of control bits;
- a decoder having an input for receiving the sequence of coded data and an output for providing an intermediate sequence of data, said decoder comprising a Huffman decoder and a run-length decoder connected in series thereto;
- a quantizer for quantizing the intermediate sequence of data with a pre-established step;
- an encoder connected to an output of said quantizer for providing an output sequence of coded data, said encoder comprising a run-length coder and a Huffman coder connected in series thereto; and
- a third circuit for merging the output sequence of control bits and the output sequence of coded data for producing the output bitstream having the desired bit-rate.

23. A device according to claim 22 further comprising a dequantizer connected between said decoder and said quantizer for dequantizing the intermediate sequence of data.

24. A device according to claim 22 wherein the input and output bitstreams of coded digital video data comprises MPEG data.

25. A device according to claim 22 wherein the input and output bitstreams of coded digital video data comprises MPEG2 data.

26. A device according to claim 22 further comprising a bit rate control circuit connected to said encoder for setting quantizing of the intermediate sequence of data by said quantizer.

27. A device according to claim 22 wherein said third circuit comprises a multiplexer connected to outputs of said first circuit, said second circuit and said encoder.

* * * * *